United States Patent
Zheng

(10) Patent No.: US 7,233,725 B2
(45) Date of Patent: Jun. 19, 2007

(54) 1×N FANOUT WAVEGUIDE PHOTODETECTOR

(75) Inventor: Jun F. Zheng, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 12 days.

(21) Appl. No.: 11/042,537

(22) Filed: Jan. 25, 2005

(65) Prior Publication Data
US 2005/0145783 A1    Jul. 7, 2005

Related U.S. Application Data

(62) Division of application No. 10/008,922, filed on Dec. 7, 2001, now Pat. No. 6,856,733.

(51) Int. Cl.
*G02B 6/26* (2006.01)
*G02B 6/42* (2006.01)

(52) U.S. Cl. .............................. 385/40; 385/9; 385/28

(58) Field of Classification Search ............ 385/10–14, 385/16, 24, 39, 8, 9, 27, 28, 40, 132; 372/45; 356/356–358
See application file for complete search history.

(56) References Cited

U.S. PATENT DOCUMENTS

| | | | |
|---|---|---|---|
| 3,952,265 A | | 4/1976 | Hunsperger |
| 4,324,492 A | * | 4/1982 | Drenckhan et al. ......... 356/481 |
| 4,827,482 A | * | 5/1989 | Towe et al. ............ 372/50.123 |
| 5,396,328 A | | 3/1995 | Jestel et al. |
| 5,416,861 A | | 5/1995 | Koh et al. |
| 5,701,396 A | | 12/1997 | Liedenbaum et al. |
| 5,812,708 A | | 9/1998 | Rao |
| 5,889,903 A | | 3/1999 | Rao |
| 6,084,992 A | | 7/2000 | Weber et al. |
| 6,125,217 A | | 9/2000 | Paniccia et al. |
| 6,205,163 B1 | * | 3/2001 | Hamamoto ............. 372/43.01 |

(Continued)

OTHER PUBLICATIONS

Koh, Seungug , et al., "Synchronous global clock distribution on multichip modules using optical waveguides", *Optical Engineering*, vol. 33, No. 5, (May 1994),1587-1595.

(Continued)

*Primary Examiner*—Sung Pak
*Assistant Examiner*—Daniel Petkovsek
(74) *Attorney, Agent, or Firm*—Schwegman, Lundberg, Woessner & Kluth, P.A.

(57) ABSTRACT

A 1×N fanout waveguide detector is disclosed. The detector includes a multiple-mode interference (MMI) cavity with input and output ends. A single-mode waveguide is optically coupled to the input end of the MMI cavity so that the optical power in the guided mode is distributed over N modes. The MMI cavity forms N interference nodes at or near its output end. N waveguide detectors are optically coupled to the output end at or near the N interference nodes. The waveguide detectors each have a waveguide that is evanescently coupled to an intrinsic region of a PIN detector. The width of the detector waveguide core, which can be submicron, defines the carrier collection distance between the electrodes of the PIN detector. Further, the length of the detector waveguide can be selected to maximize optical absorption to provide optimum quantum efficiency. The waveguide detectors are connected in parallel to provide a high-output photocurrent.

20 Claims, 13 Drawing Sheets

U.S. PATENT DOCUMENTS

| | | |
|---|---|---|
| 6,351,576 B1 | 2/2002 | Ding |
| 6,400,490 B1* | 6/2002 | Hosoi ........................ 359/254 |
| 6,661,943 B2 | 12/2003 | Li |
| 6,842,472 B1* | 1/2005 | Shimonaka ................ 372/50.1 |
| 6,925,265 B2* | 8/2005 | Franco et al. ............... 398/189 |
| 2001/0026570 A1* | 10/2001 | Hisanaga et al. ............ 372/45 |
| 2002/0172464 A1* | 11/2002 | Delwala ..................... 385/40 |
| 2002/0172894 A1* | 11/2002 | Fallahi et al. .............. 430/321 |
| 2003/0002797 A1 | 1/2003 | Chu et al. |
| 2003/0081878 A1* | 5/2003 | Joyner et al. ................. 385/14 |
| 2004/0131310 A1* | 7/2004 | Walker ....................... 385/29 |

OTHER PUBLICATIONS

Sze, S. M., *High-Speed Semiconductor Devices*, Sections 10.4-10.5; Wiley-Interscience Publications, John Wiley & Sons, Inc., New York,(1990),605-613.

\* cited by examiner

1×N FANOUT WAVEGUIDE PHOTODETECTOR

RELATED APPLICATION(S)

This application is a Divisional of U.S. application Ser. No. 10/008,922 filed Dec. 7, 2001, now U.S. Pat. No. 6,856,733, which is incorporated herein by reference.

FIELD OF THE INVENTION

The present invention pertains to photodetectors, and in particular to waveguide-based high-speed photodetectors.

BACKGROUND OF THE INVENTION

There are many lightwave applications, such as optical telecommunications and chip interconnects, that involve transmitting optical signals and converting them to electrical signals at high data rates. The systems for performing such transmission and conversion usually require a photodetector compatible with the speed and bandwidth of the optical signal. The typical photodetectors are PIN (p-type/intrinsic semiconductor material/n-type) semiconductor detectors.

To date, it has been a challenge to make a Si-based semiconductor PIN photodetector with a bandwidth of 10 GHz or greater. Conventional discrete PIN Si detectors operate at speeds of 2 GHz or less because of their relatively low absorption coefficient and low carrier collection efficiency. The best Si detector known today is the interdigitated lateral trench device (LTD), which operates at speeds of up to 6.5 GHz due to improved absorption by the trench structure.

It is well known that excess optical power density in PIN photodetectors causes detector speed degradation. This is especially true for waveguide-based PIN photodetectors because light is coupled in to a small region about the size of the waveguide. As a result, the detector may not be able to operate at high photocurrent where high-speed operation may require a high current. Where such a system employs evanescent coupling to the intrinsic region of the PIN detector, the intrinsic region can be expanded to dilute the optical power, which in turn prevents the creation of excess carriers. However, the light distribution in the expanded waveguide region (i.e., the waveguide plus the intrinsic region) is not uniform so that the detector electrodes need to be made relative large to ensure adequate detection of the photon-generated carriers. Unfortunately, the relatively large electrode area results in a relatively high detector capacitance, which reduces detector speed. Further, the non-uniform distribution of light in the expanded waveguide region can result in high optical fields, which generate local excess photon-generated carriers. This reduces the detector speed when the excess carriers have to diffuse out of the local excess carrier area to be collected by the electrodes.

Further, photon-generated carriers formed in the intrinsic region of a PIN detector may collected either via electrodes in the top or bottom of the detector as discussed above, or by metal-semiconductor-metal (MSM) interdigitated electrodes on the surface of the intrinsic region. In the first design, the carrier collection distance is set by the required minimum detector thickness for efficient light absorption due to evanescent coupling with the waveguide. This thickness, however, limits the detector speed. In the latter design, photon-generated carriers also have to travel to the interdigitated electrodes across the detector, so that the detector thickness also limits the detector speed.

DETAILED DESCRIPTION OF THE INVENTION

In the following detailed description of the embodiments of the invention, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

Figure 1:
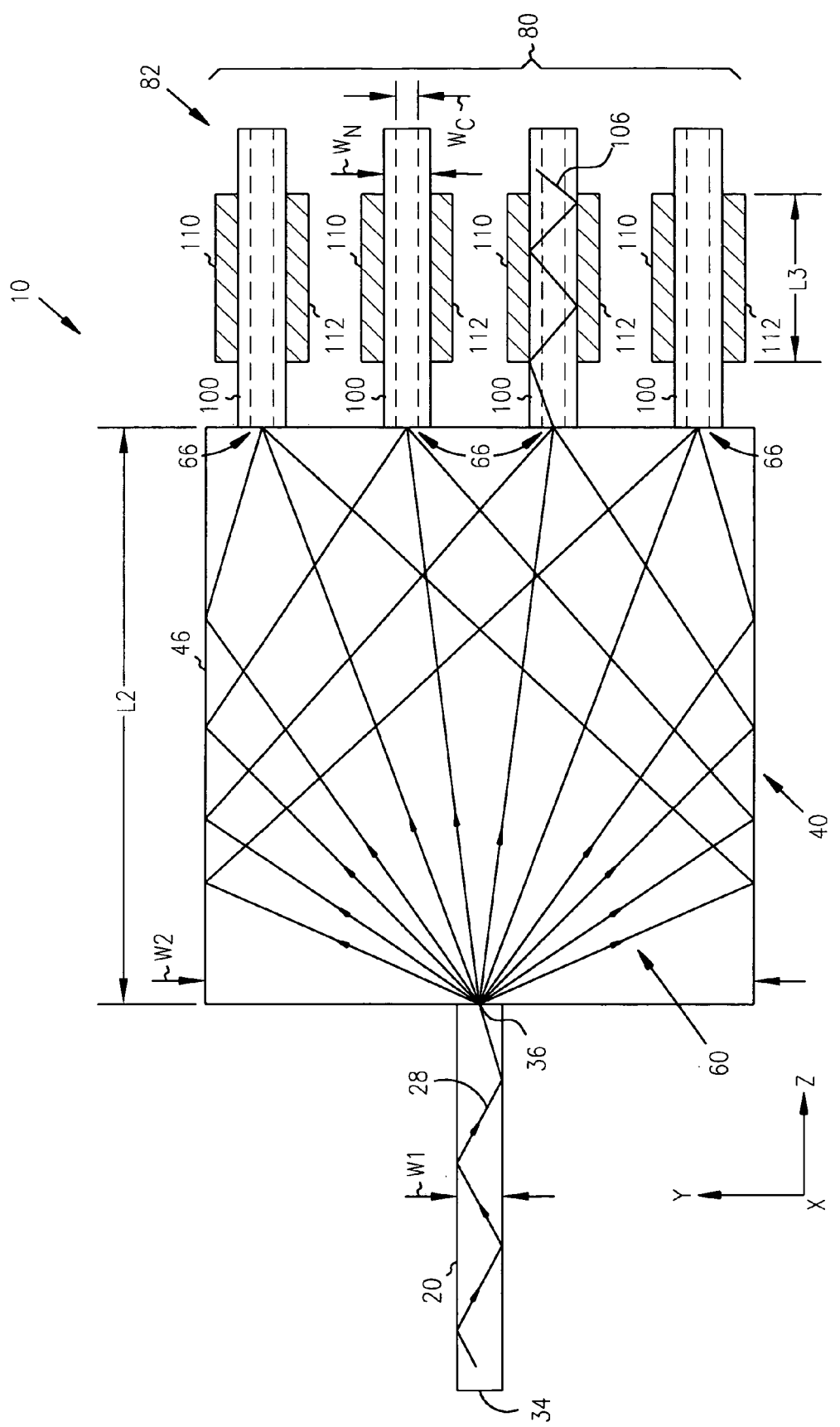
FIG. 1 is a plan view of the waveguide photodetector of the present invention, with the guided modes illustrated schematically as light rays.
Figure 2:
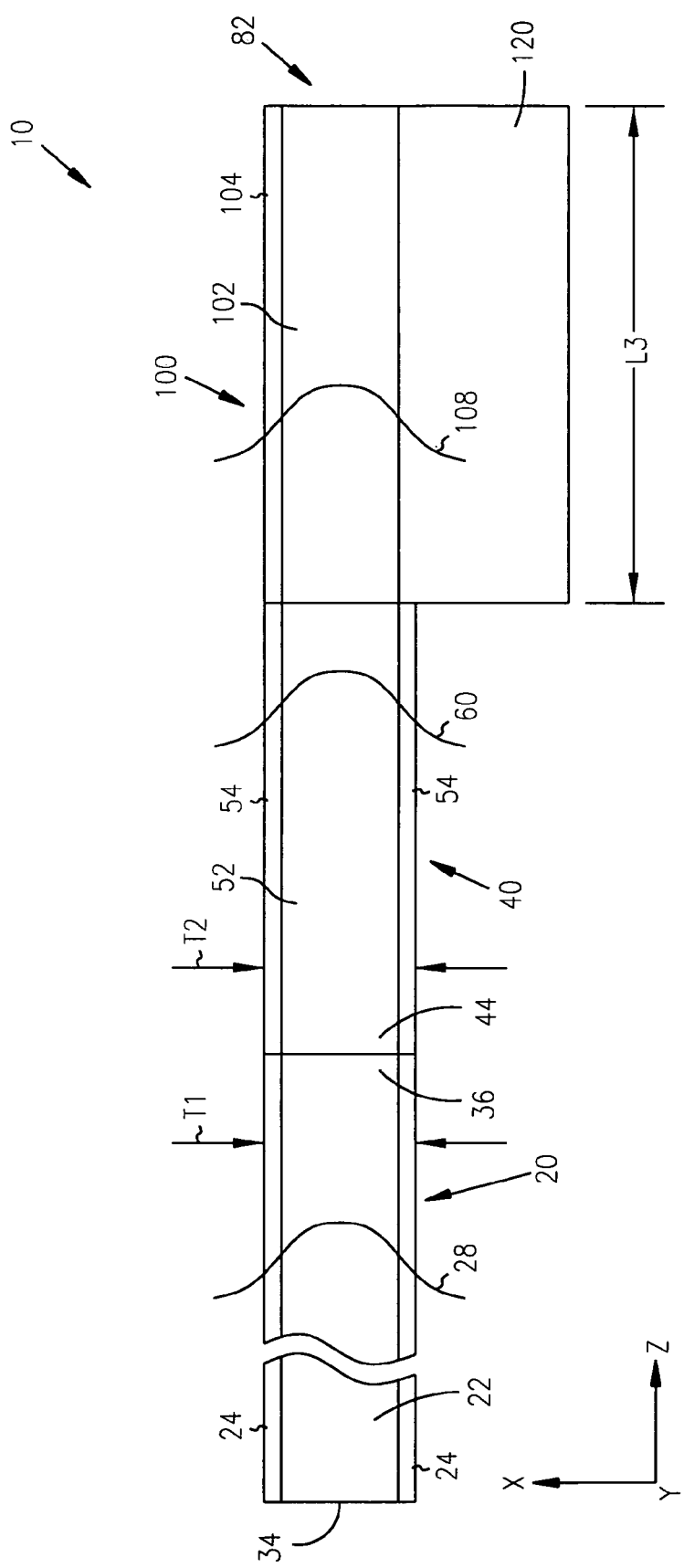
FIG. 2 is a cross-sectional view of the waveguide photodetector of FIG. 1 showing the core and cladding for the input waveguide, the MMI cavity and one of the detector waveguides, with the guided modes illustrated as electromagnetic waves.

With reference to FIGS. 1 and 2, there is shown an integrated waveguide-based photodetector system 10 comprising an input waveguide 20 having a core 22 and a cladding 24. In an example embodiment, the waveguide is designed to support a single waveguide mode 28, as illustrated schematically in FIG. 1 as a light ray and in FIG. 2 as an electromagnetic wave. The waveguide may be designed to support more than a single waveguide mode.

Input waveguide 20 also has an input end 34, an output end 36, and is optically coupled to a multi-mode interference (MMI) cavity 40 at the output end. The input waveguide may comprise any semiconductor or dielectric material transparent to the wavelenth of light being detected. In an example embodiment, the material making up core 22 is preferably high index, and the material making up cladding 24 is preferably low index. For example, the waveguide may comprise $Si_3N_4$ for transmission of light having a wavelength of 850 nm or intrinsic silicon for wavelengths of 1 micron or greater. Input waveguide cladding 24 may be, for example, $SiO_2$, which has a relatively low refractive index (about 1.5) as compared to that of $Si_3N_4$ (about 3.5) at near-infra-red and infra-red wavelengths. Use of a high-index core and a low-index cladding allows for the input waveguide to have a relatively small (i.e., sub-micron) thickness T1 (X-dimension) and width W1 (Y-dimension).

MMI cavity 40 has an input end 44 to which output end 36 of input waveguide 20 is optically coupled. MMI cavity 40 also has an output end 46 opposite input end 44, and a length L2. MMI cavity 40 is formed from a semiconductor or dielectric material transparent to the wavelength of light being detected. For the sake of convenience, MMI cavity 40 preferably comprises the same material as input waveguide 20 so that the input waveguide and the MMI cavity can be formed as an integrated structure. In an example embodiment, the thickness T2 of MMI cavity 40 is the same as the thickness T1 of waveguide 20, while the width (Y-dimension) W2 of the MMI cavity is greater than the width W1 of the waveguide.

By way of example, input waveguide 20 may have a width W1 in the range from about 0.1 to about 0.5 microns, while MMI cavity 40 may have a width W2 in the range from about 5 microns to 10 microns. MMI cavity 40 includes includes a core 52 and a cladding 54 surrounding the core. In an example embodiment, core 52 comprises the same material as core 22 and cladding 54 comprises the same material as cladding 24. Futher in an example embodiment, cores 22 and 52 are contiguous and claddings 24 and 54 are contiguous.

The length L2 of MMI cavity 40 is designed so that the incoming single waveguide mode 28 from waveguide 20 spreads (i.e., "fans out") in the Y-direction into N multiple waveguide modes 60 within the MMI cavity. Each mode 60 carries a corresponding fraction of the input energy of waveguide mode 28. In FIG. 1, multiple waveguide modes 60 are schematically represented as light rays. MMI cavity 40 serves to disperse the optical power density of single waveguide mode 28 by a factor of N. Further, the length L2 of MMI cavity 40 is designed so that interference nodes 66 arising from the constructive interference of the N waveguide modes (i.e., the intersection of the light rays) are located at or near cavity output end 46.

System 10 further includes an array 80 of N (N≧2) waveguide detectors 82 optically coupled to MMI cavity 40 at output end 44 at or near interference nodes 66. Each waveguide detector 82 includes a waveguide 100 with a core 102, a cladding 104, a lower surface 106, a core width $W_C$ and an overall width (core plus cladding) of $W_N$. Waveguide 100 preferably supports a single guided mode 106. Widths $W_C$ and $W_N$ can vary between waveguides but is preferably the same for each waveguide for the sake of convenience. Waveguide detectors 82 further include p+ and n+ electrodes 110 and 112 arranged on opposite sides of waveguide 100 below the plane defined by waveguide lower surface 106.

Figure 3:
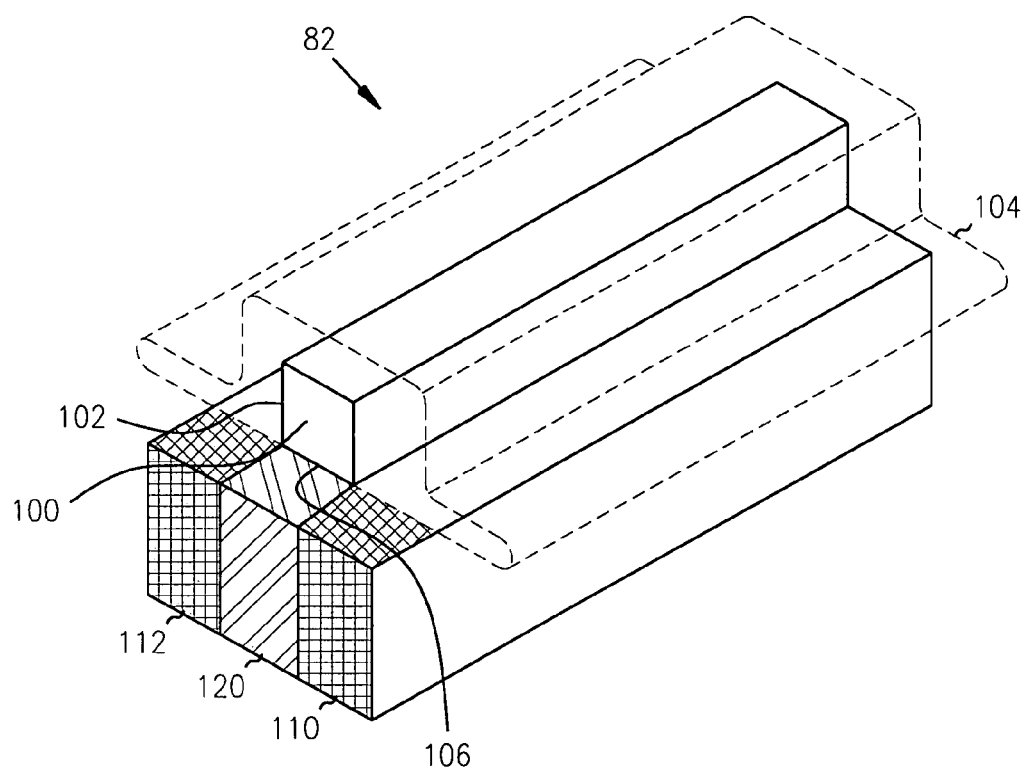
FIG. 3 is a perspective end view of one of the waveguide detectors, showing the relationship between the waveguide portion of the detector, the underlying intrinsic layer, and the p+ and n+ electrodes surrounding the intrinsic layer, along with the conformal cladding layer (dashed line)

FIG. 3 is a perspective close-up endview of one of waveguide detectors 82. Electrodes 110 and 112 are separated by an intrinsic region 120 residing directly underneath waveguide lower surface 106, which is optically coupled to waveguide 100. Intrinsic region 120 therefor has a width equal to or substantially equal to the core width $W_C$ of waveguide 100. In an example embodiment, intrinsic region 120 is formed under waveguide 100 in combination with the self-aligned formation of n+ and p+ electrodes 110 and 112, formed with respect to waveguide core 102. Intrinsic region 120 is made from a semiconductor material, and in example embodiments comprises either silicon or germanium.

Thus, each waveguide detector 82 has a PIN configuration with the photo-generated carrier collection distance within intrinsic region 120 equal to or substantially equal to core width $W_C$ of waveguide 100. As mentioned above, it is preferable that waveguides 100 be single mode so that the core width $W_C$ is as small as possible. The core width $W_C$ can be made sub-micron by using a high-index contrast between core 102 and cladding 104. In an example embodiment, core 102 includes a high-index integrated-circuit (IC) compatible material, such as $Si_3N_4$ surrounded by cladding 104 that includes a low index dielectric such as silicon dioxide. This allows for very fast detector speeds, e.g., greater than about 10 GHz when detectors 82 have an intrinsic region comprising silicon, and greater than about 40 GHz when detectors 82 have an intrinsic region comprising germanium.

The difference in detector speeds between silicon and germanium is related to the higher absorption coefficient and carrier mobility of germanium, which is 4× faster than that of silicon. An advantage of using germanium in forming intrinsic region 120 is that the length L3 of the intrinsic region can be made short (e.g., about 5 microns) as compared with the length associated with silicon (e.g., about 80 microns long). Thus, forming intrinsic region 120 from germanium provides for a compact waveguide photodetector system 10 with smaller capacitance.

Each waveguide detector 82 has a longitudinal configuration where light is transferred to and absorbed by intrinsic region 120 as it propagates down detector waveguide 100 (i.e., the Z direction). This allows each waveguide detector 82 to have high total quantum efficiency (e.g., greater than about 80%), since the length L3 of intrinsic region 120 can be tailored to provide the optimum absorption efficiency. The length L3 of intrinsic region 120 (also called the "absorption length") has minimal impact on detector speed since the photon carrier collection direction is the Y-direction, which is perpendicular to the light propagation and absorption direction, which is the Z-direction.

Further, photon-generated carriers are formed mostly in intrinsic region 120 rather than under n+ electrode 110 and p+ electrode 112 because there is no direct light path to the electrodes. Thus, fewer slow-drift carriers, which reduce the speed of the detector, are generated.

In waveguide detector system 10, the screening effect of high-density space-charge fields due to high-density photon-generated carriers by high optical power density is mitigated by dividing the incoming power density by a factor of N and then coupling the diluted power into the N separate waveguide detectors 82. This allows for fast detection speeds. Further, detectors 82 can be arranged to operate in parallel so that a high-output photocurrent (e.g., greater than about 100 microamperes) is generated. The amount of output photocurrent depends on the number of parallel waveguide detectors used. In example embodiment, 10 parallel waveguide detectors are used to generate an output photocurrent of about 100 microamperes. The use of multiple parallel waveguide detectors 82 provides for a minimum electrode area and thus a minimum capacitance and resistance, further increasing the speed of waveguide photodetector system 10.

Method of Fabrication (FIGS. 4–10)

Figure 4:
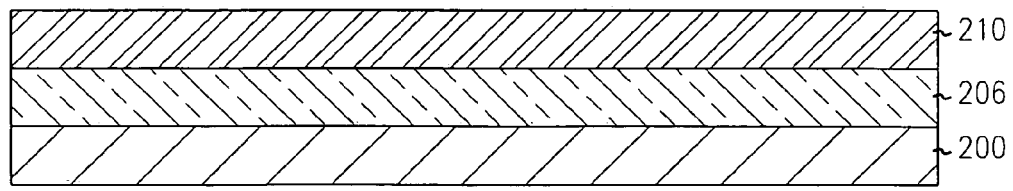
FIG. 4 is side view of a substrate with a silicon-on-insulator (SOI) structure formed thereon.

With reference now to FIG. 4, the method of fabricating an integrated waveguide-based photodetector system 10 as described above begins with providing a substrate 200. Substrate 200 is preferably formed from an IC-compatible material, such as a semiconductor material such as silicon, or saphire. For the sake of discussion, it is presumed below that substrate 200 is silicon.

Atop silicon substrate 200 is formed a insulating layer 206, such as silicon dioxide or other dielectric. Insulating layer 206 serves to optically and electrically isolate substrate 200 from system 10 to be formed thereon. Thus, in an example embodiment, insulating layer 206 may have a thickness, for example, of about 1 to about 3 microns.

Atop insulating layer 206 is formed a semiconductor layer 210, which can be Si, Ge, $Ge_xSi_{1-x}$, or Ge on Si. For the sake of discussion, it is assumed layer 210 is Si, thereby forming a silicon-on-insulator (SOI) structure. Silicon layer 210 may have a thickness, for example, of 0.25 to 0.5 microns.

Figure 5:
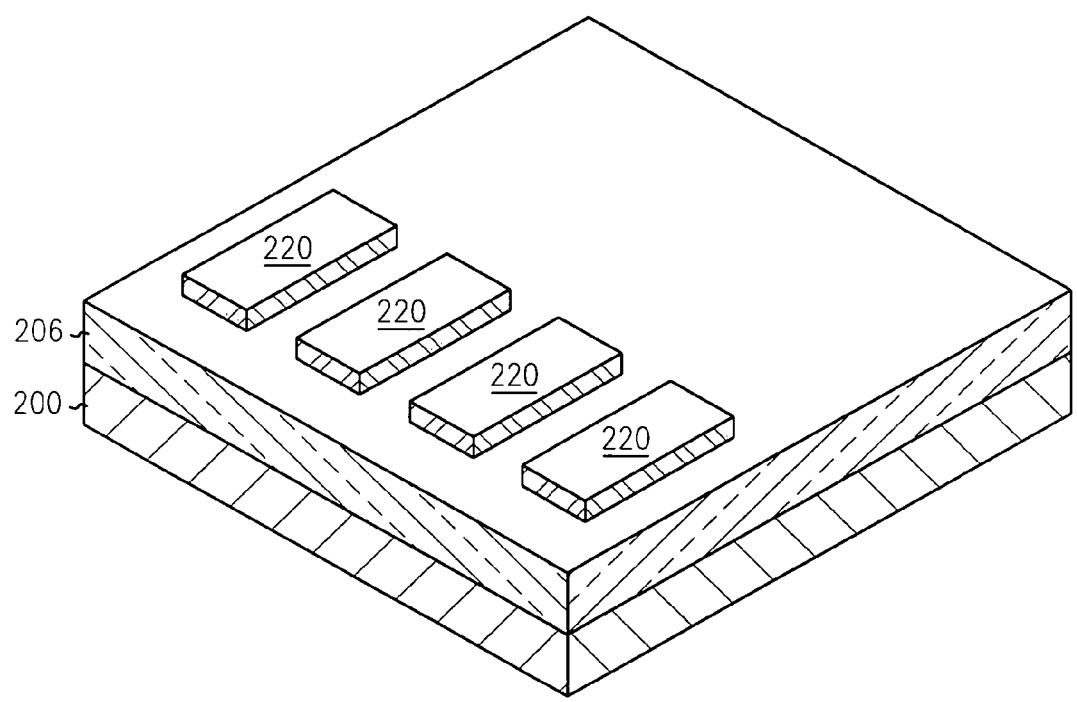
FIG. 5 is a top-down perspective view of the SOI structure of FIG. 4, with islands are formed from a portion of the silicon layer.

In FIG. 5, silicon layer 210 is lithographically processed using well known techniques (e.g., coating with a layer of photoresist, photolithographically exposing the resist with a pattern, developing the resist and then etching the resist) to define silicon islands 220 over a portion of insulating layer 206.

Figure 6A:
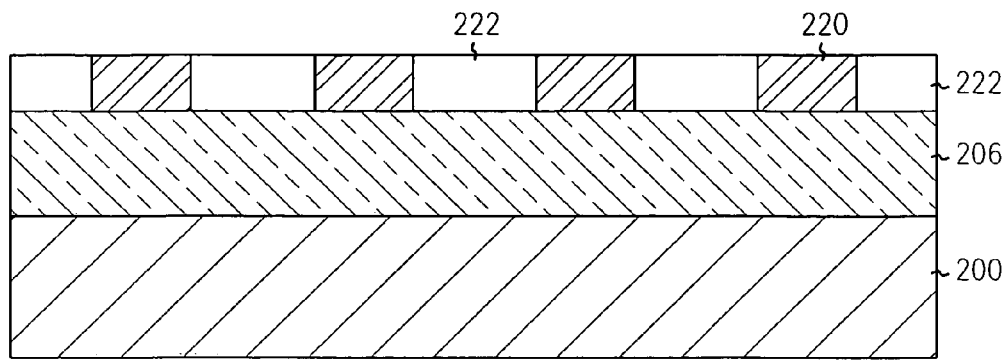
FIG. 6A is a side view of the structure of FIG. 5, with insulation regions formed between the silicon islands.

In FIG. 6A, an oxide layer 222 (e.g., $SiO_2$) is deposited over the structure of FIG. 5 and is polished, e.g., via a chemical-mechanical polish (CMP) process, until the top of islands 220 are exposed. This results in silicon islands 220 being insulated from each other by portions of oxide layer 222.

In an example embodiment, the surface of silicon islands 220 may be optionally processed using a standard gate oxide cycle, which includes buff oxidation to remove CMP-induced damage, pre-clean, gate oxidation, and a passivation anneal. Further, with reference to FIG. 6B, in another example embodiment, a stress release layer 230 of oxide of about 100 to 200 Angstroms thick is optionally formed atop silicon islands 220 to facilitate the next step in the process.

The stress release layer may also serve as cladding 104 formed between intrinsic region 120 and core 104 of waveguide 100 (FIG. 2).

Figure 6B:
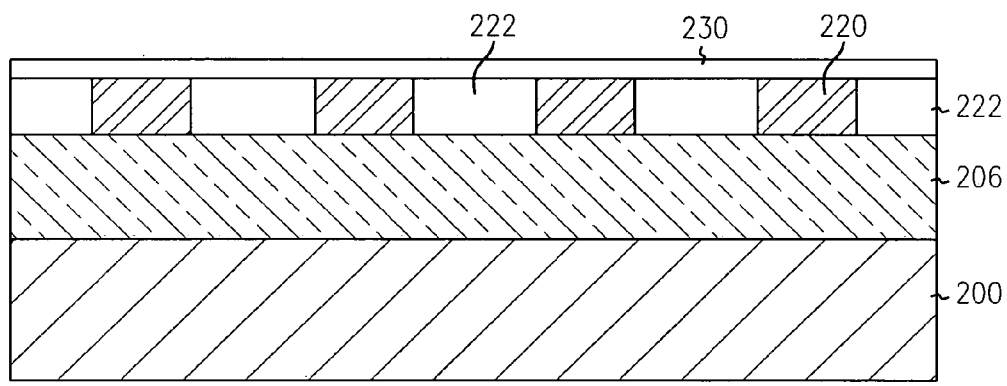
FIG. 6B is the same side view as FIG. 6A, further including an optional thin layer of oxide atop the structure.
Figure 7A:
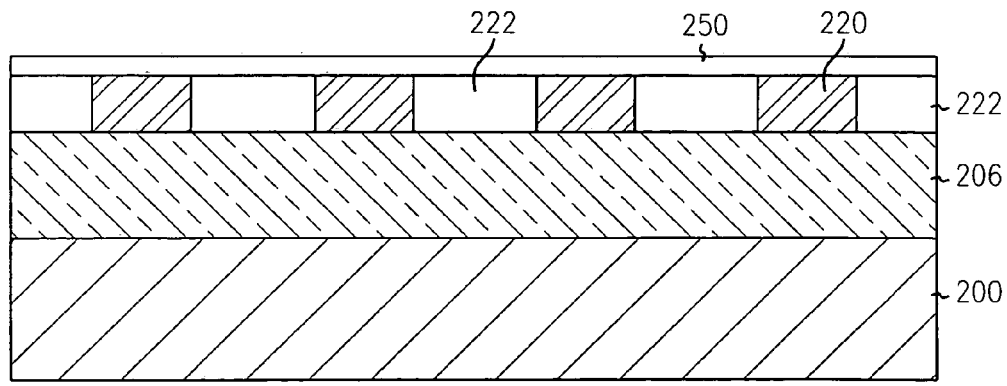
FIG. 7A is a side view of the structure of FIG. 6A, with a waveguide layer formed atop the structure.

In FIG. 7A, a waveguide layer 250 is formed atop the structure of FIG. 6A (or alternatively, atop the structure of FIG. 6B). In one example embodiment, waveguide layer 250 comprises one of Si, Ge, Ge on Si, $Ge_xSi_{1-x}$, $SiO_xN_y$, and $Si_3N_4$. Waveguide layer 250 has a thickness designed to support a given number of waveguide modes at a given wavelength when surrounded by a cladding layer of a given material. Thus, in an example embodiment, the thickness of waveguide layer 250 can range from the sub-micron (e.g., from about 0.1 micron) to several microns.

Figure 7B:
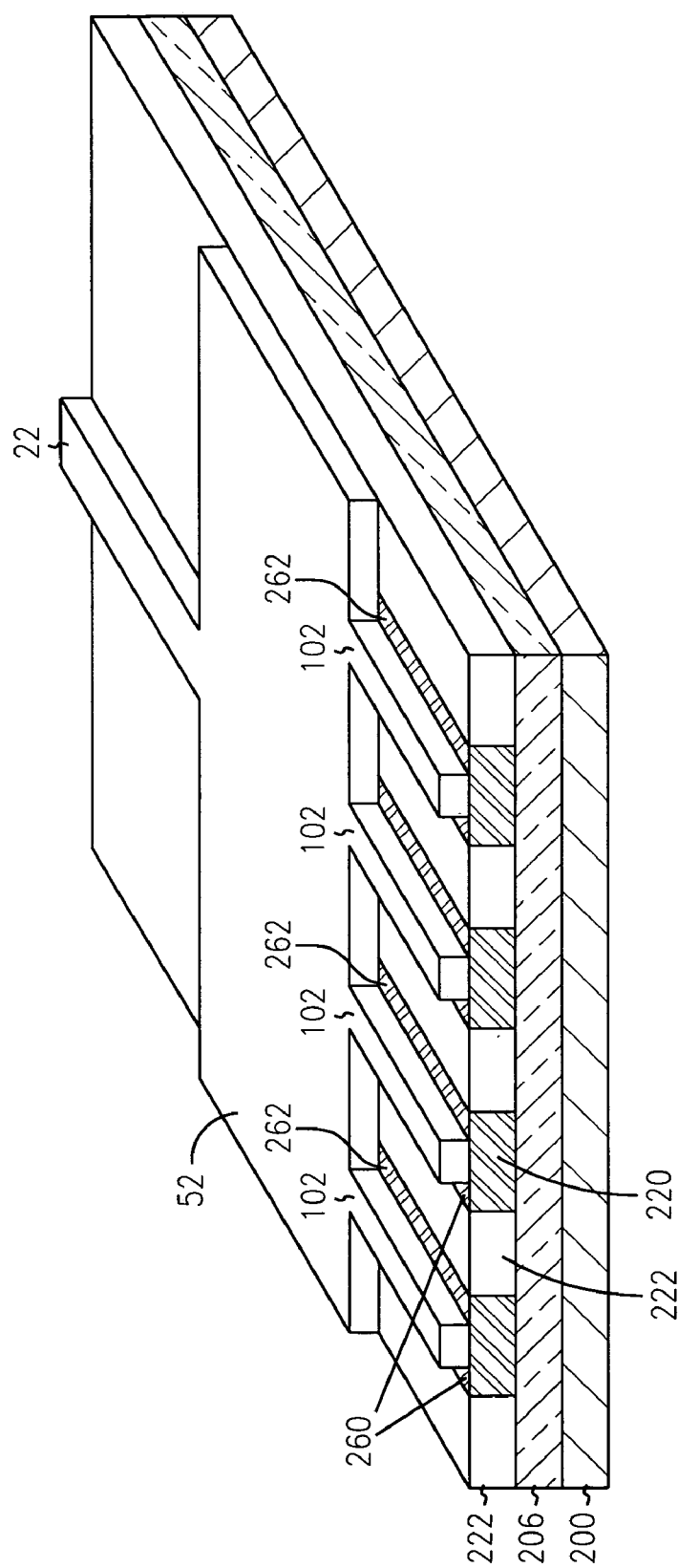
FIG. 7B is a top-down perspective view of the structure of FIG. 7A, but with the waveguide layer processed to create the core regions for the input waveguide, the MMI cavity, and the N detector waveguides.

In FIG. 7B, waveguide layer 250 is lithographically processed to define core 22 of waveguide 20, core 52 of MMI cavity 40 and cores 102 of waveguides 100, with cores 102 aligned to silicon islands 220. Each core 102 does not cover the entire silicon island 220 so that portions 260 and 262 of each island on either side of the core are exposed.

Exposed portions 260 are n+ doped and exposed portions 262 are p+doped to an form n+ electrode 110 and a p+ electrode 112 adjacent each core 102. In an example embodiment, doping is achieved by ion implantation in a manner that makes n+ electrode 110 and p+ electrode self-aligned with core 102.

Figure 8:
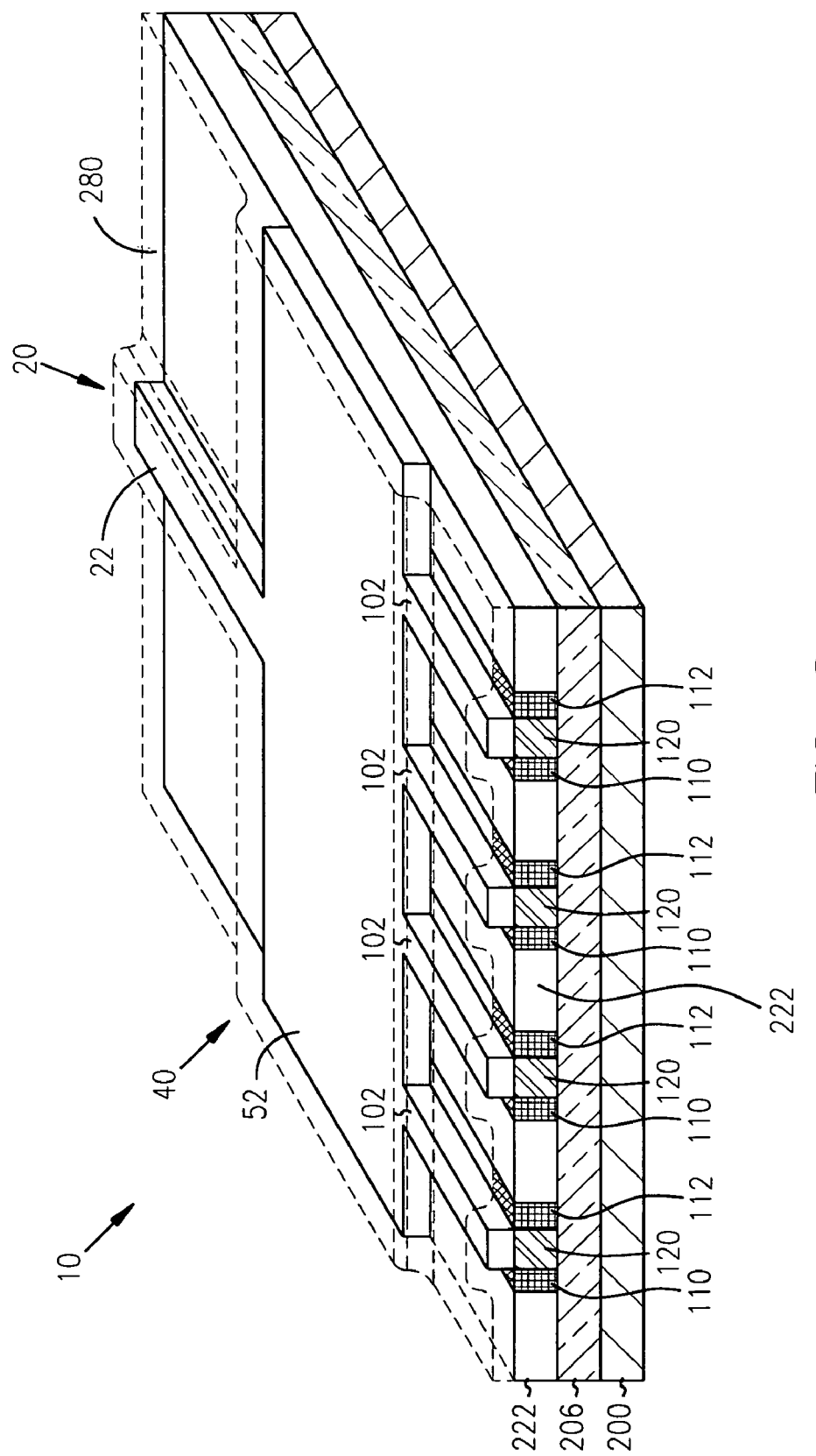
FIG. 8 is top-down perspective view of the structure of FIG. 7, with n+ and p+ electrodes formed in portions of the silicon island adjacent each waveguide detector core to form PIN detectors beneath each waveguide detector, and also showing the conformal cladding layer formed over the structure.

In FIG. 8, a cladding layer 280 is conformally deposited atop the remaining waveguide layer 250 to complete the formation of input waveguide 20, MMI cavity 40 and detector waveguides 100. Cladding layer 280 may be any dielectric, such as silicon dioxide or polyimide, so long as the index of the cladding layer is less than that of waveguide layer 250 for the particular operating wavelength.

The undoped silicon region remaining beneath each waveguide core 102 becomes intrinsic region 120. The width of intrinsic layer 120 is substantially equal to the width $W_C$ of core 102 and defines the carrier collection distance. All the n+ electrodes 110 and p+ electrodes 112 are preferably connected in parallel so that detectors 82 form array 80 of N parallel detectors capable of generating a high photocurrent current.

Figure 9A:
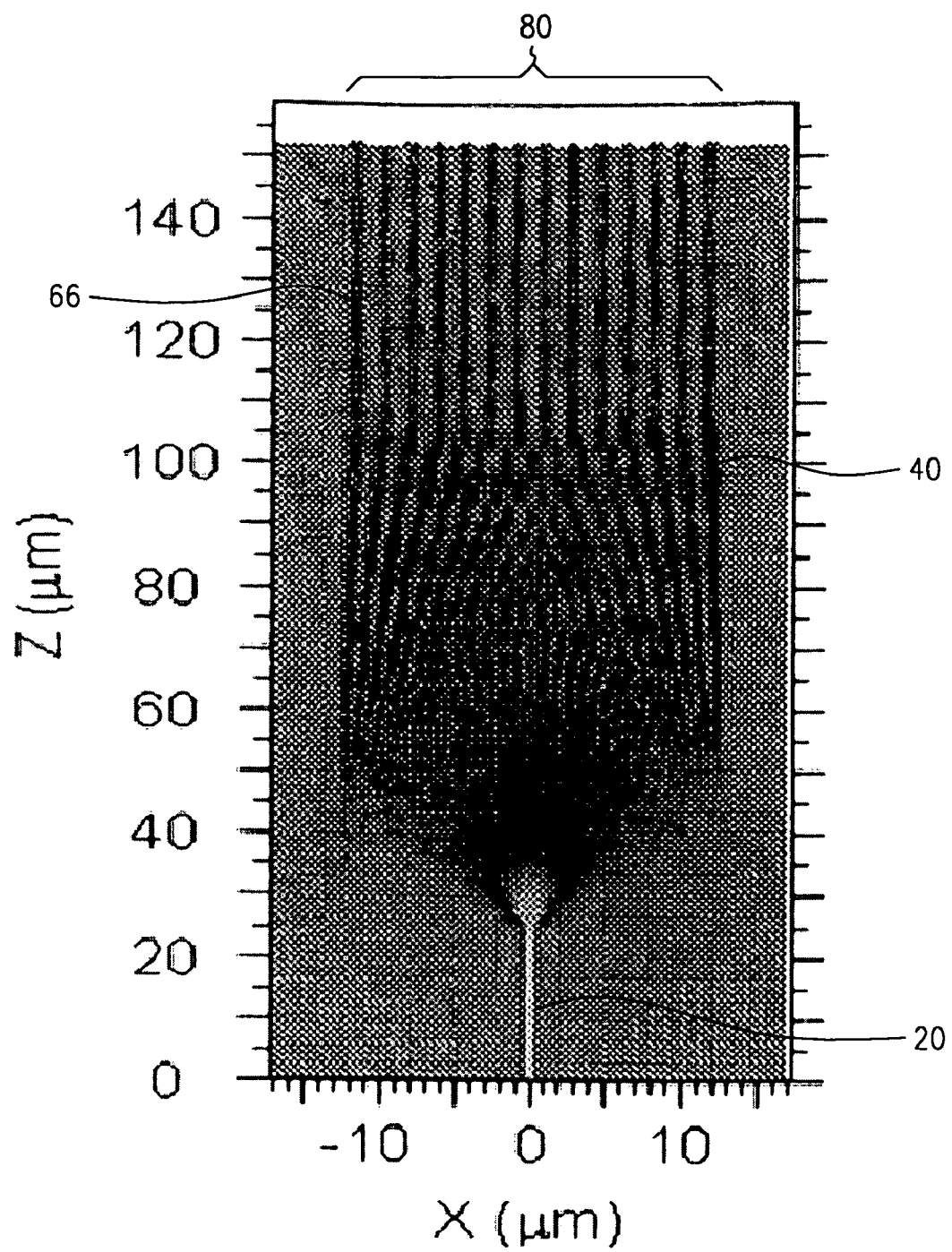
FIG. 9A is two-dimensional simulation of the optical power distribution in an example waveguide photodetector of the present invention having a 1×8 fanout MMI coupled to a single-mode input waveguide with a silicon core having a width of 0.25 microns surrounded by a $SiO_2$ cladding, the guided light having a wavelength of 1.3 microns.
Figure 9B:
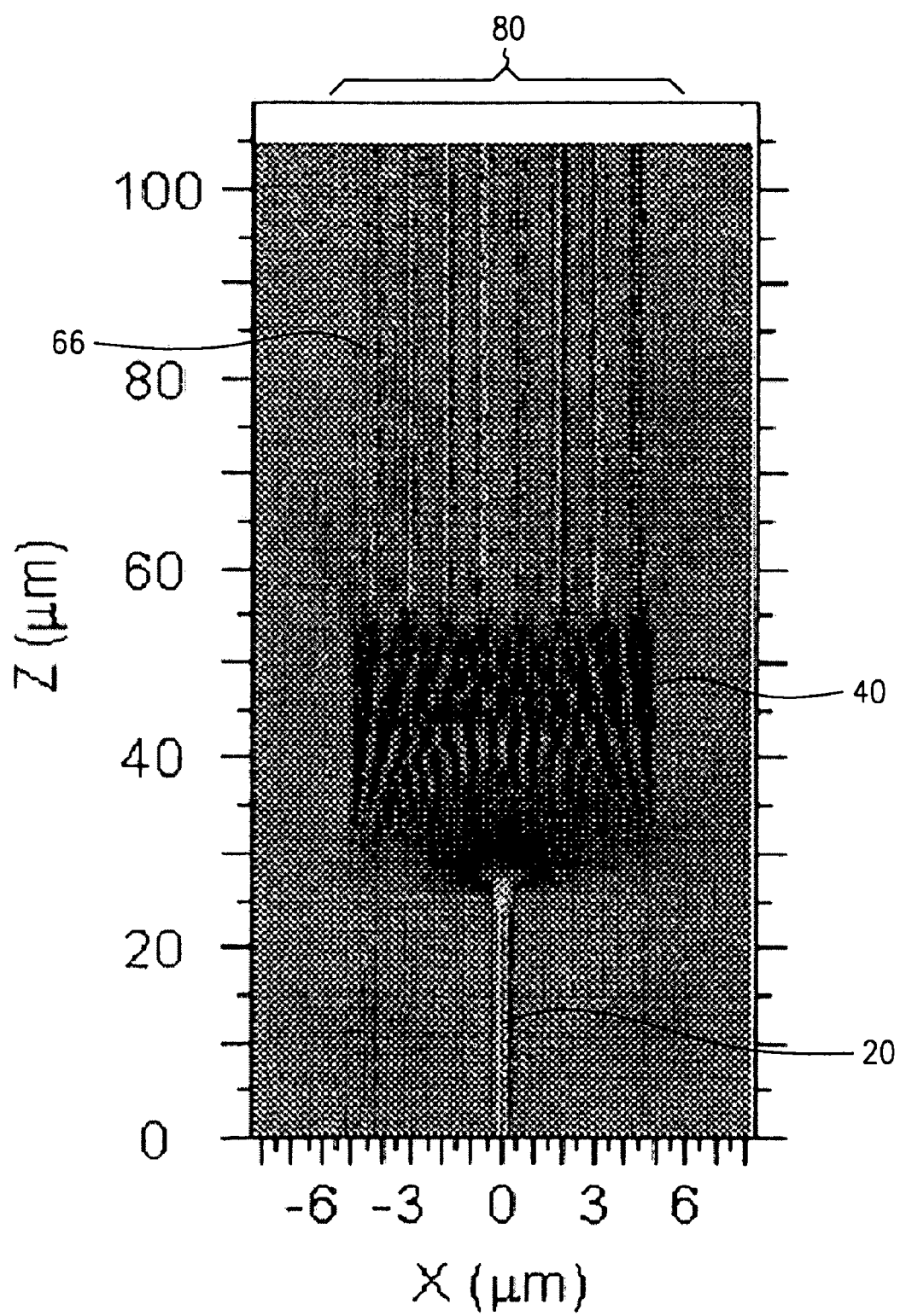
FIG. 9B is two-dimensional simulation of the optical power distribution in an example of a waveguide photodetector of the present invention having a 1×14 fanout MMI coupled to a single-mode waveguide with a $Si_3N_4$ core having a width of 0.6 microns surrounded by a $SiO_2$ cladding, the guided light having a wavelength of 850 nm.

With reference to FIGS. 9A and 9B, there is shown two-dimensional simulations of the distribution of optical power in two example waveguide photodetector systems 10 according to the present invention. The simulations were performed using a commercial software package called the rSoft BPM simulator, available from www.rsoftinc.com.

In FIG. 9A, core 22 of waveguide 20 is modeled based on a silicon core of width 0.25 microns surrounded by an $SiO_2$ cladding, thereby providing an index differential between the core and cladding of about 1.5. The guided light has a wavelength of 1.3 microns. In the present invention, the dimensions of MMI cavity needed to achieve a given value of N for the fanout can be readily determined by similation. MMI cavity 40 of FIG. 9A has a length L2 of approximately 30 microns and a width W2 of approximately 10 microns and supports a fanout of N=8. The total optical power preserved within the 1×8 fanout is calculated at about 81%. The simulation also shows interference nodes 66 at which waveguide detectors 82 are located.

In FIG. 9B, core 22 of waveguide 20 is modeled based on $Si_3N_4$ core with a width of 0.6 microns surrounded by an $SiO_2$ cladding. The guided light has a wavelength of 0.85 microns. MMI cavity 40 of FIG. 9B has a length L2 of approximately 100 microns and a width W2 of approximately 25 microns and supports a fanout of N=14. The total optical power preserved within the 1×14 fanout is calculated at about 84%.

Figure 10:
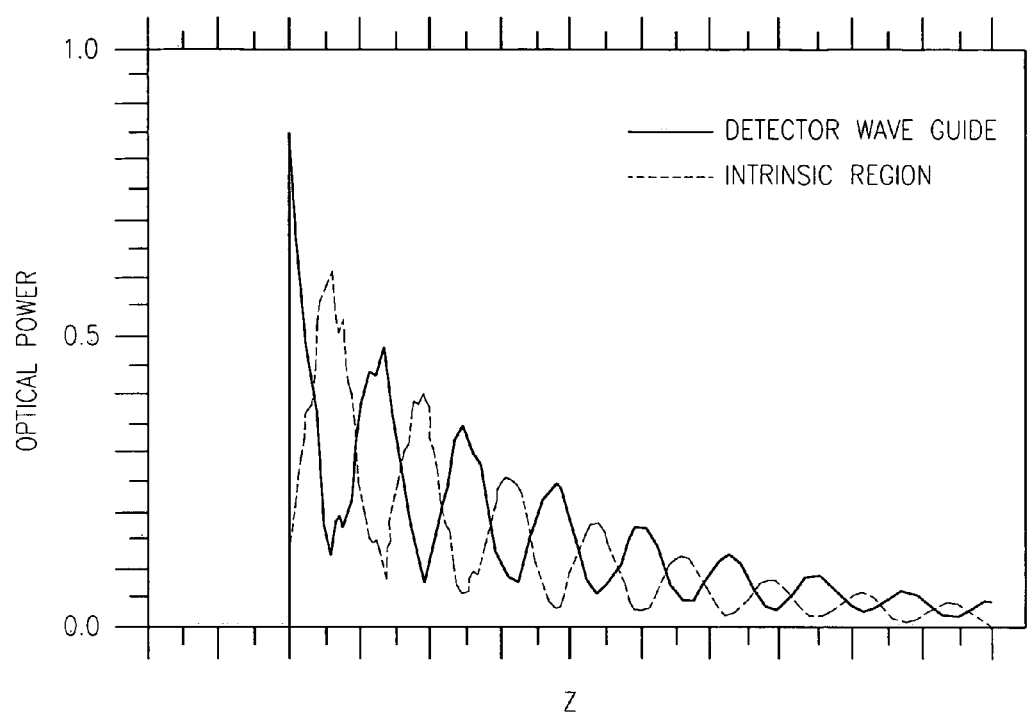
FIG. 10 is a plot of the normalized optical power distribution in a detector waveguide (solid line) along with a plot of the optical power in the intrinsic region below the waveguide (dashed line) illustrating the power transfer from the detector waveguide to the intrinsic region of the PIN detector as a function of the length of the intrinsic region.

In FIG. 10, there is shown a three-dimensional simulation of the optical power distribution in a $Si_3N_4$ detector waveguide 100 having a core width $W_C$ of 0.4 microns. The wavelength of the guided light is 850 nm, and intrinsic region 120 beneath the waveguide is silicon with dimensions 1 micron×1.2 microns×75 microns. The capacitance of the waveguide detector is about 10fF. From the plot, it can be seen how the optical power in the waveguide (solid line) oscillates and decays as the light propagating in waveguide 100 is evanescently coupled to and absorbed by underlying intrinsic region 120. Likewise, the optical power in intrinsic region 120 (dashed line) also oscillates in synchrony (but 90 degrees out of phase) with the waveguide optical power, and decays as the light is absorbed in the intrinsic region. The absorbed light results in the generation of photon-generated carriers, resulting in a current detected by surrounding electrodes 110 and 112. The coupling efficiency is calculated to be in excess of about 90%. Quantum efficiency can be optimized by selecting the appropriate length L3 of intrinsic region 120. The longer L3 is, the higher the quantum efficiency. However, the length L3 is limited to minimize the capacitance. The carrier collection speed is optimized by selecting the smallest possible cross-section core width $W_C$ for waveguide 100.

Optoelectronic Systems

Figure 11:
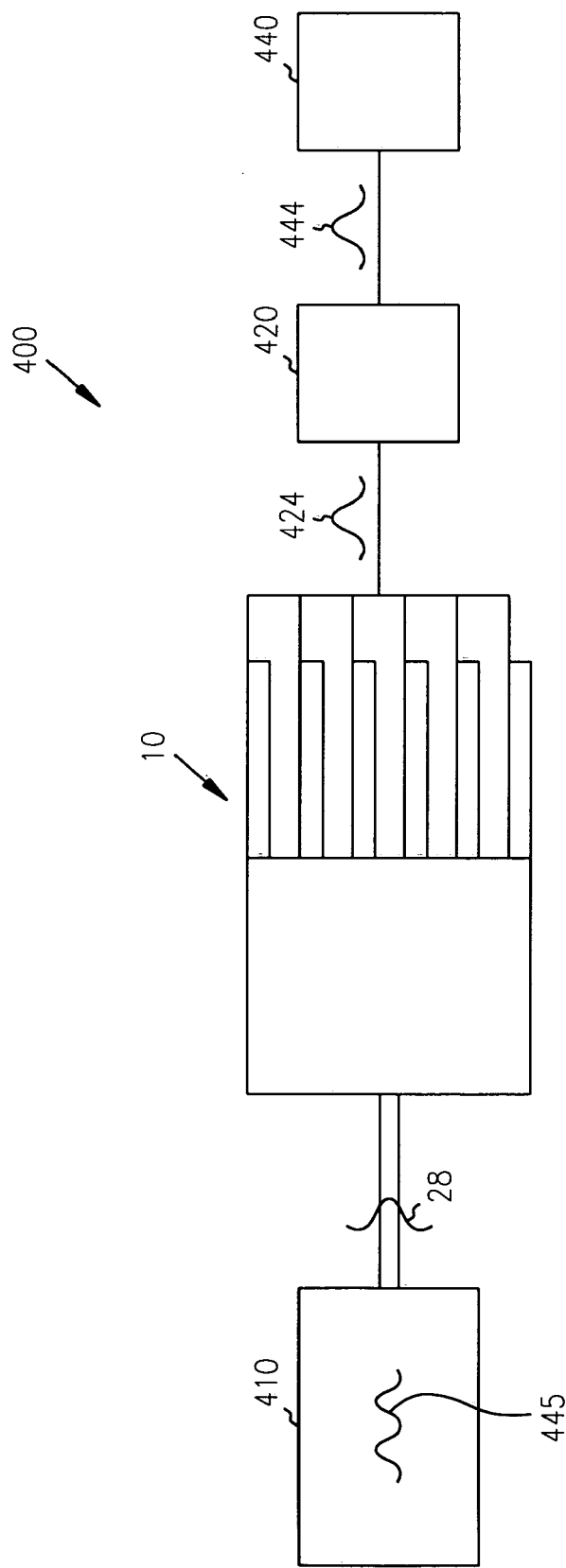
FIG. 11 is a schematic diagram of an optoelectronic system that includes the waveguide photodetector of the present invention.

With reference to FIG. 11, there is shown a generalized optoelectronic system 400 that includes the waveguide photodetector 10 of the present invention. Optoelectronic system 400 includes an optical or optoelectronic input device 410 optically coupled to input waveguide 20 of waveguide photodetector 10. Input device 410 may include, for example, a laser diode or a vertical cavity surface emitting laser (VCSEL). Optoelectronic system 400 further includes an electronic or optoelectronic output device 420 electrically coupled to waveguide detectors 82 to receive a photocurrent electrical signal 424 generated by waveguide photodetector 10. Optionally included in optoelectronic system 400 is a second output device operatively coupled to the first output device for receiving an electrical signal 444 from the first output device and further processing the signal.

In operation, input device 410 generates an optical signal (i.e., light) 445 and inputs the optical signal to input waveguide 20. Optical signal 445 propagates down input waveguide 20 as guided mode 28. As discussed above, guided mode 28 is fanned out (dispersed) into N guided modes 60 by MMI cavity 40, which formes N interference nodes 66 (FIG. 1). Waveguide detectors 82 detect the light at interference nodes 66 and convert the light into a photocurrent electrical signal 424, which is outputted to and received by output device 420.

Figure 12:
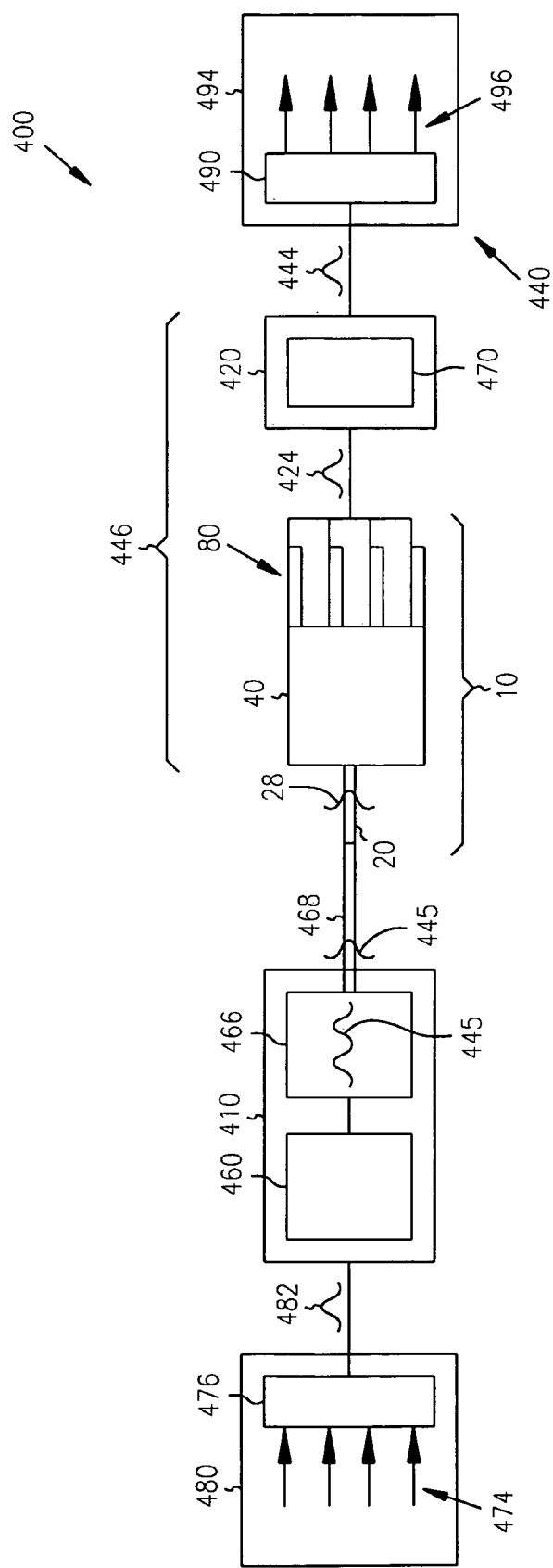
FIG. 12 is a schematic diagram of an on-board or on-chip optoelectronic communication system incorporating the waveguide photodetector of the present invention as a more detailed example of the generalized optoelectronic system of FIG. 11.

Optoelectronic system 400 represents a large number of possible systems. By way of example, with reference to FIG. 12, optoelectronic system 400 represents an on-board or on-chip communication system, wherein input device 410 constitutes an optical transmitter, and waveguide photodetector 10 and output device 420 together constitute an optical receiver 446. Input device/optical transmitter 410 includes driver electronics 460 (e.g., a transimpedance amplifer) electrically connected to a laser diode 466, and a waveguide 468. Waveguide 468 is optically coupled to the laser diode at one end and to waveguide 20 of input device/optical transmitter 410 at its other end. In an example embodiment, waveguide 468 is single mode. In a further example embodiment, output device 420 includes pre-amplifier electronics 470.

In operation, a plurality of electronic signals 474 are multiplexed by a time-division multiplexer 476 residing on a first chip or board 480 to form a multiplexed electrical signal 482. Multiplexed electrical signal 482 is passed to input device/optical transmitter 410. Input device/optical transmitter 410 receives multiplexed electrical signal 482 and converts it to optical signal 445, which is inputted to waveguide 468. Optical signal 445 is transmitted through waveguide 468 as a guided mode and passes to waveguide 20, where it continues to propagate as waveguide mode 28. As described above in connection with FIG. 1, waveguide mode 28 enters MMI cavity 40 and is fanned out (dispersed) by MMI cavity 40 and detected by waveguide detector array 80 to produce photocurrent electrical signal 424.

Photocurrent electrical signal 424 is outputted to and received by pre-amplifier electronics 470 in output device 420. Signal 424 is processes by pre-amplifier electronics 470 to form an electronic signal 444, which is passed to a time-division demultiplexer 490 as part of a second chip or board 494 constituting second output device 440 (FIG. 11). Time-division demultiplexer 490 receives electronic signal 444 and forms demultiplexed electronic signals 496 to be processed by other electronic elements (not shown) on second chip or board 494.

In another example embodiment, optoelectronic system 400 constitutes a telecommunication/data communication system similar in design to the on-chip or on-board system described above, with waveguide 490 being a length of optical fiber (single mode or multimode), and including analogous multiplexing and demultiplexing processing elements and processes.

In yet another example embodiment, optoelectronic system 400 can be used to form a optoelectronic clocking source. An optoelectronic clocking source utilizing the waveguide photodetector of the present invention can performing high-speed clocking, since the large amounts of optical power and the corresponding high photocurrent required can be handled by the waveguide photodetector of the present invention.

Figure 13:
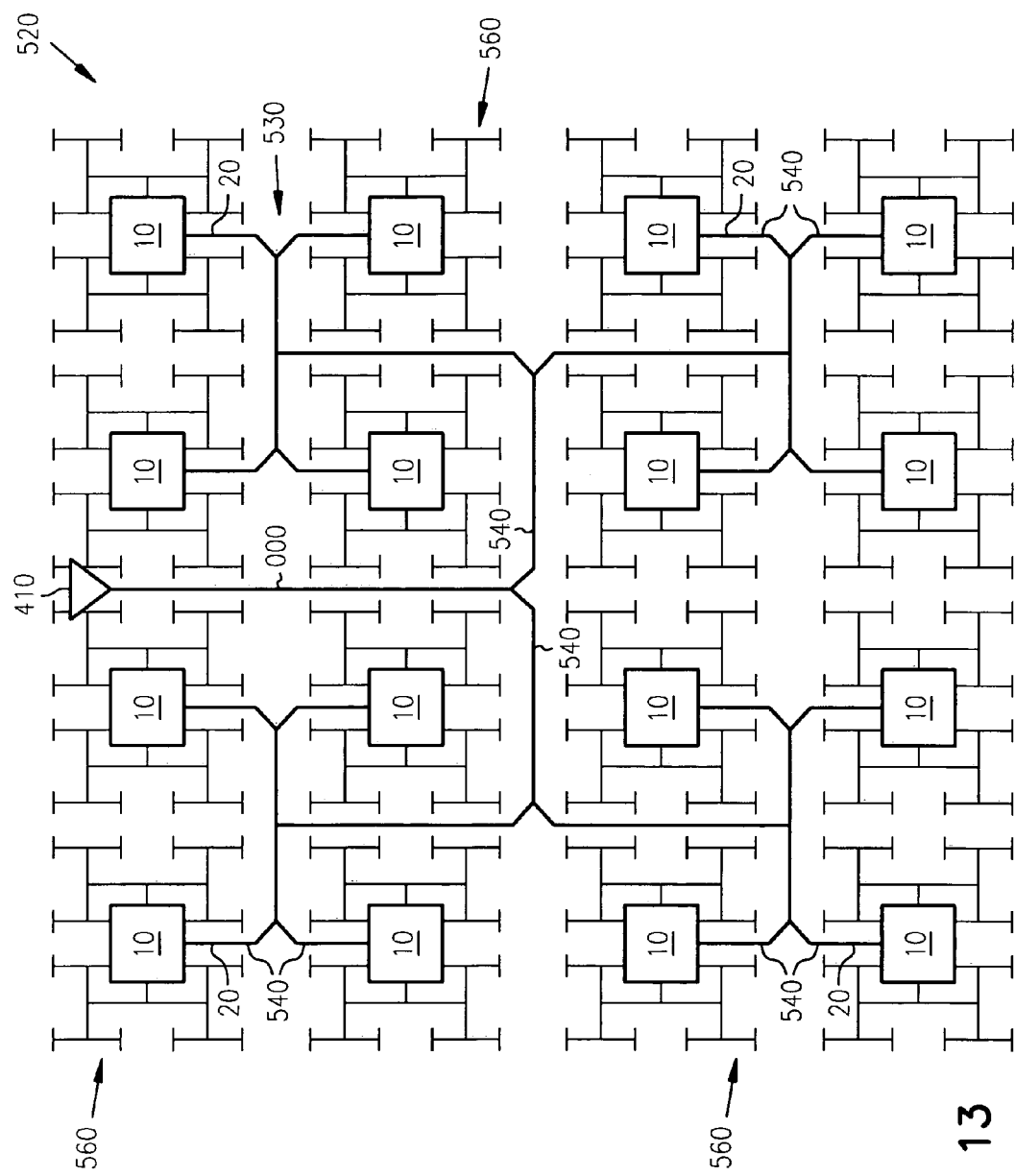
FIG. 13 is a schematic diagram of an optoelectronic clocking circuit incorporating the waveguide photodetector of the present invention, as a more detailed example of the generalized optoelectronic system of FIG. 11.

With reference to FIG. 13, there is shown an example optical clocking source system 520 that includes optical/optoelectronic input device 410 coupled to an optical edge tree 530. Optical edge tree 530 comprises a main waveguide 536 from which extends a number of equal length waveguide branches 540, each capable of supporting a portion of optical signal 445. Each waveguide branch 530 is equal in length and is connected to the input waveguide 20 of a waveguide photodetector 10.

The output of each waveguide photodetector 10 is connected to an electrical edge tree 560 having electrical (e.g., conducting) branches 570 of equal length that support a portion of photocurrent electrical signal 424. Each electrical branch 570 of electrical edge tree 560 is connected to an output device 420, such as a transimpedence amplifier (FIG. 11). The equal lengths of the waveguide branches and the equal lengths of the electrical brances provide for the equal timing of the optical and electrical signals necessary in a clocking circuit. As optical waveguide branches can be longer than electrical branches when forming clocking circuits, the clocking signal source (e.g., input device 410) can be located relatively far away (e.g., off-chip) in an optoelectronic clocking circuit as compared to an all-electrical clocking circuit.

While the present invention has been described in connection with preferred embodiments, it will be understood that it is not so limited. On the contrary, it is intended to cover all alternatives, modifications and equivalents as may be included within the spirit and scope of the invention as defined in the appended claims.

What is claimed is:

1. An system comprising:
a waveguide photodetector including:
a multiple mode interference (MMI) cavity having an input end and an output end;
an input waveguide optically coupled to the MMI cavity at the input end;
an array of detector waveguides optically coupled to the MMI cavity at the output end and each optically coupled to an intrinsic region having first and second electrodes on opposite sides of the intrinsic region to detect photon-generated carriers formed in the intrinsic region and output a photocurrent;
an input device optically coupled to the input waveguide that generates an optical signal and inputs the optical signal into the input waveguide; and
an output device to receive the photocurrent.

2. The system of claim 1, wherein each detector waveguide includes a core, a cladding, and a lower surface and an intrinsic region disposed underneath the lower surface and surrounded by the first and the second electrodes, wherein the core is longitudinally aligned along the intrinsic region and optically coupled to the intrinsic region.

3. The system of claim 1, wherein each detector waveguide has a core with a core width, and wherein each intrinsic region has a carrier collection distance substantially equal to the core width.

4. The system of claim 1, wherein the MMI cavity has a length such that interference nodes are located at the output end such that each interference node is substantially at an entrance to each detector waveguide.

5. The system of claim 1, wherein each detector waveguide is a single mode waveguide.

6. The system of claim 1, wherein each detector waveguide has a quantum efficiency greater than about 80%.

7. The system of claim 1, wherein each intrinsic region includes germanium.

8. The system of claim 1, wherein the input device includes a laser diode or a vertical cavity surface emitting laser.

9. The system of claim 1, wherein the output device includes a transimpedance amplifier.

10. A system comprising:
an optical transmitter having drive electronics;
a coupling waveguide; and
an optical receiver optically coupled to the optical transmitter by the coupling waveguide, the optical receiver having a waveguide photodetector and an output device to receive a photocurrent from the waveguide photodetector, the waveguide detector including:
a multiple mode interference (MMI cavity having an input end and
an output end;
an input waveguide optically coupled to the MMI cavity at the input end, the input waveguide coupled to the coupling waveguide;
an array of detector waveguides optically coupled to the MMI cavity at the output end and each optically coupled to an intrinsic region having first and second electrodes on opposite sides of the intrinsic region to detect photon-generated caters formed in the intrinsic region and output the photocurrent.

11. The system of claim 10, wherein each detector waveguide includes a core, a cladding, and a lower surface and an intrinsic region disposed underneath the lower surface and surrounded by the first and the second electrodes, wherein the core is longitudinally aligned along the intrinsic region and optically coupled to the intrinsic region.

12. The system of claim 10, wherein the coupling waveguide is a single mode waveguide.

13. The system of claim 10, wherein the system further includes a time-division multiplexer to provide a multiplexed electrical signal to the optical transmitter.

14. The system of claim 10, wherein the system further includes a time-division demultiplexer to receive an electrical signal from the optical receiver.

15. The system of claim 10, wherein the optical transmitter, coupling waveguide, and the optical receiver are adapted as an on-chip communication system.

16. A system comprising:
an input device that generates an optical signal;
an optical edge tree comprising a main waveguide optically coupled to the input device and a plurality of equal-length waveguide branches extending from the main waveguide;
a waveguide photodetector coupled to each waveguide branch, wherein each waveguide photodetector coupled to a corresponding waveguide branch includes:
a multiple mode interference (MMI) cavity having an input end and an output end;
an input waveguide optically coupled to the MMI cavity at the input end, the input waveguide optically coupled to the corresponding waveguide branch;
an array of detector waveguides optically coupled to the MMI cavity at the output end and each optically coupled to an intrinsic region having first and second electrodes on opposite sides of the intrinsic region to detect photon-generated carriers formed in the intrinsic region and output a photocurrent; and
a plurality of electronic edge trees comprising equal-length conductive branches, with each conductive branch coupled to one of the waveguide photodetectors to receive the photocurrent.

17. The system of claim 16, wherein each detector waveguide includes a core, a cladding, and a lower surface and an intrinsic region disposed underneath the lower surface and surrounded by the first and the second electrodes, wherein the core is longitudinally aligned along the intrinsic region and optically coupled to the intrinsic region.

18. The system of claim 16, wherein each electronic edge tree branch is connected to an output device.

19. The system of claim 16, wherein the input device includes a laser diode or a vertical cavity surface emitting laser.

20. The system of claim 16, wherein the input device is an optical clocking signal source to configure the system as an optoelectronic clocking source system.

* * * * *

UNITED STATES PATENT AND TRADEMARK OFFICE
CERTIFICATE OF CORRECTION

PATENT NO. : 7,233,725 B2 Page 1 of 1
APPLICATION NO. : 11/042537
DATED : June 19, 2007
INVENTOR(S) : Zheng It is certified that error appears in the above-identified patent and that said Letters Patent is hereby corrected as shown below:

In column 9, line 53, in Claim 10, delete "(MMI" and insert -- (MMI) --, therefor.

In column 10, line 2, in Claim 10, delete "caters" and insert -- carriers --, therefor.

Signed and Sealed this

Fourth Day of September, 2007

JON W. DUDAS
*Director of the United States Patent and Trademark Office*